C. FINKBEINER.
BEET HARVESTER.
APPLICATION FILED JAN. 6, 1916.

1,246,811.

Patented Nov. 13, 1917.
2 SHEETS—SHEET 1.

Witness
Otto E. Hoddick.
John B. Dade.

Inventor
Cha's Finkbeiner
By A. J. ——
Attorney

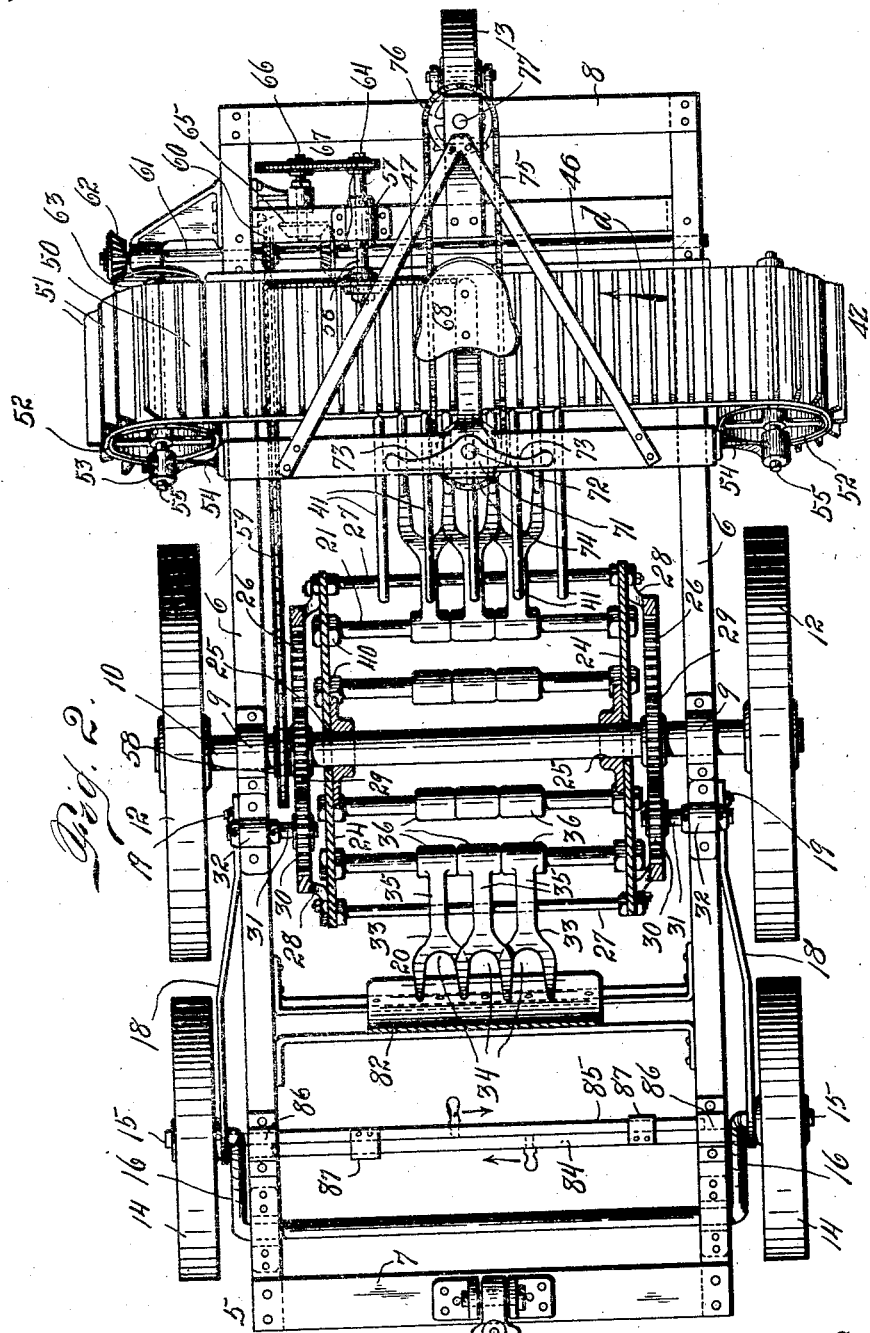

UNITED STATES PATENT OFFICE.

CHARLES FINKBEINER, OF ARVADA, COLORADO.

BEET-HARVESTER.

1,246,811.  Specification of Letters Patent.  Patented Nov. 13, 1917.

Application filed January 6, 1916. Serial No. 70,597.

*To all whom it may concern:*

Be it known that I, CHARLES FINKBEINER, a citizen of the United States, residing at Arvada, county of Jefferson, and State of Colorado, have invented certain new and useful Improvements in Beet-Harvesters; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in beet harvesters, my object being to provide a construction of this class which shall perform the function of uprooting and topping the beets in an efficient and economical manner.

My improved construction consists of a framework mounted on a pair of main or traction wheels which engage the ground, the rear of the machine being supported by a sort of caster wheel.

The uprooting devices are mounted upon a rotary member which is actuated from the traction wheels to be made to rotate in the reverse direction. The uprooted beets are carried upwardly by these devices and delivered thereby to a transversely arranged conveyer which carries the beets to a knife which severs the tops or foliage and finally discharges the beet bodies in a row at one side of the machine.

Having briefly outlined my improved construction as well as the function it is intended to perform, I will proceed to describe the same in detail, reference being made to the accompanying drawing, in which is illustrated an embodiment thereof. In this drawing:

Fig. 2 is a top view of the machine, the central portion of the latter being shown in section taken on the line 2—2, Fig. 1.

The same reference characters indicate the same parts in both views.

Figure 1:
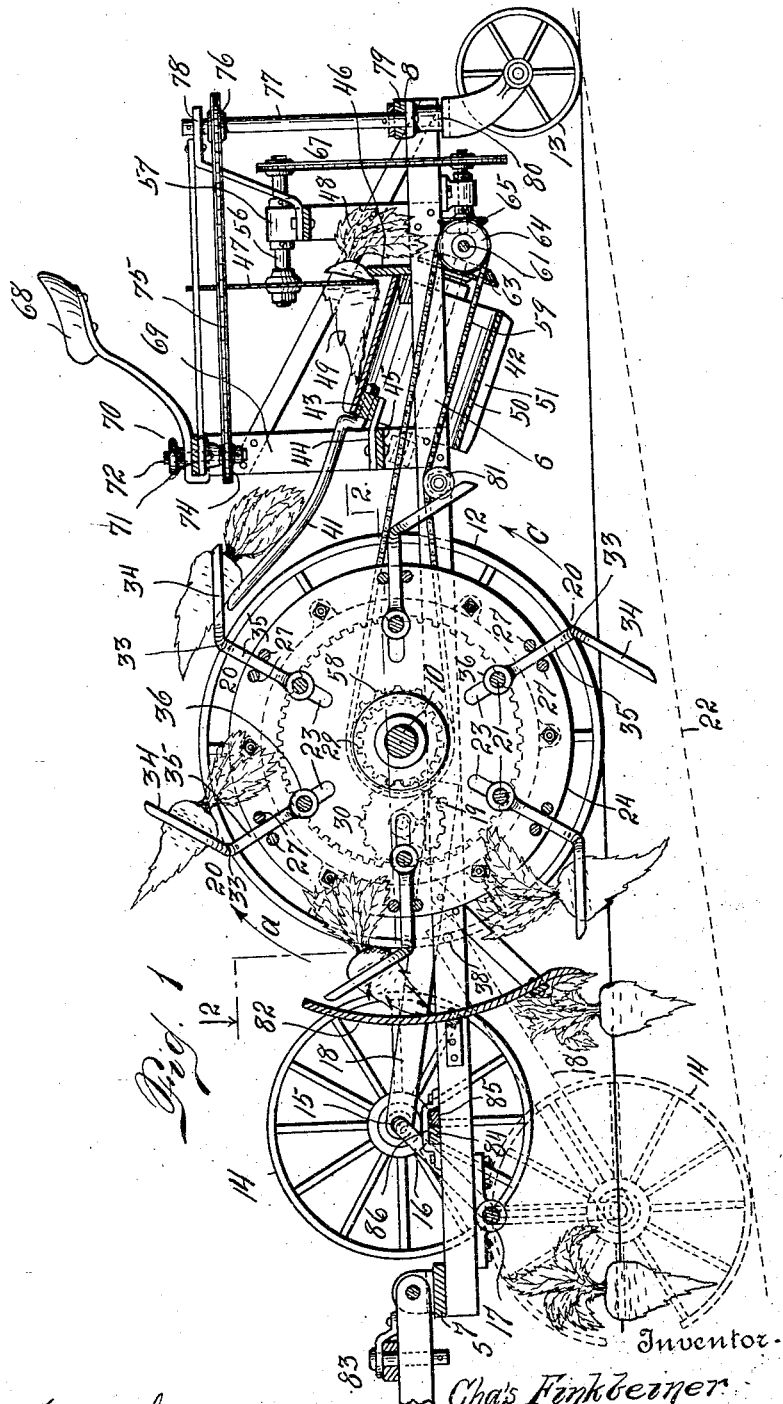
Figure 1 is a central vertical longitudinal section of the machine.

Let the numeral 5 designate a framework composed mainly of longitudinally disposed bars 6 which are suitably spaced and connected at their front and rear ends by cross pieces 7 and 8. Journaled in boxes 9 mounted on the side bars 6, is a main shaft or axle 10 to the opposite extremities of which are made fast ground or traction wheels 12 which in conjunction with a rear caster wheel 13, constitute the support for the framework of the machine above the ground when the apparatus is in use.

When the machine is not in use for beet harvesting purposes, a pair of forwardly located wheels 14 journaled on a crank shaft 15 whose crank arms 16 are journaled in boxes 17 made fast to the forward portions of the bars 6 on the under side, engage the ground and support the machine in conjunction with the rearwardly located caster wheel 13. When the machine is in use for beet harvesting purposes the crank shaft is swung upwardly to the position shown in full lines in Fig. 1, the crank shaft where it is engaged by the wheels 14 being journaled in spaced arms 18 pivotally connected with the framework of the machine as shown at 19. When it is desired to transport the machine from place to place by moving the same over the ground, the wheels 14 and their connections are moved to the position shown by dotted lines in Fig. 1, in which event the surface of the ground may be indicated by the dotted line 22, thus indicating that the beet pulling device will be free to travel over the ground without engaging the same. It is evident that any other suitable means may be employed for supporting the framework of the machine in such a manner that the traction wheels and the uprooting devices may be supported above the ground, the machine in this event being supported and transported through the medium of the wheels 14 in front and the caster wheel 13 in the rear.

The uprooting devices 20 are mounted upon rods 21 whose extremities pass through radially disposed slots 23 formed in end disks 24 which are suitably spaced and journaled as shown at 25 on the main shaft or axle 10. Mounted on each disk 24, is an interiorly cogged gear 26 which is connected with the adjacent disk 24 by means of rods 27 which pass through perforations in the two disks and through registering openings formed in curved lugs 28 formed on the two gears, the said lugs, as illustrated in the drawing, being cast integral with the gears.

Fast on the axle 10 are two gears 29 which mesh with idler gears 30 mounted on short shafts 31, the latter being journaled in boxes 32 mounted on the side bars 6 of the frame. The two gears 29 and 30 are of such diameter that the gears 30 mesh with the interiorly cogged gears 26 and when the machine is traveling in the performance of its function, with the traction wheels on the ground, the disks 24 together with their connecting rods are rotated in the direction of arrow $a$, Fig. 1, or in the reverse direction of the travel of the traction wheels 12, the latter when the machine is traveling forwardly, rotating in the direction indicated by the arrow $c$, Fig. 1.

As shown in the drawing, each uprooting device 20 is composed of three members each of which is designated by the numeral 33. Each of these members has a bifurcated or forked extremity 34 adapted to enter the ground and engage beets for uprooting purposes. Each member 33 also has an arm 35 which terminates at its inner extremity in a sleeve 36 which is fast upon a rod 21 of the rotary structure which carries the uprooting devices, as heretofore explained. Since there is a number of members 33 and these members of any set are arranged side by side, there are three bifurcations 34 any one of which may engage and uproot a beet when the machine is in operation. The other uprooting devices which do not directly engage the beet in question, will serve to loosen the ground adjacent the beet whereby the uprooting function may be successfully performed. As shown in the drawing, the bifurcated extremities 34 of each member of each uprooting device form an angle with the arm 35, each of these arms passing between two rods 27 as best illustrated in Fig. 1. These rods serve to securely support the uprooting devices upon the rotary structure, and permit the movement of the arms in radial lines in one direction or the other, according as it may be necessary to lengthen or shorten the reach of the bifurcated extremities of the uprooting devices. The adjustment of these uprooting devices may be brought about by loosening nuts 40 applied to the rods 21 and screwed against the inner surfaces of the disks 24. When these nuts are loosened the rods may be moved in the slots 23, whereby the uprooting devices may be moved toward or away from the axle 10, after which, by tightening the said nuts the rods 21 and the uprooting devices carried thereby may be maintained in the adjusted position.

When the machine is in operation for beet harvesting purposes, it is moved forwardly over the ground, one of the traction wheels 12 being on each side of the row of beets to be uprooted. As the uprooting devices revolve or travel with the rotary member heretofore described, each of the uprooting devices will enter the ground below the tread of the traction wheels, far enough to uproot the beet, one of the bifurcated members serving to engage the body of the beet on opposite sides while the other members serve to loosen the earth around the beet. Each beet is then carried upwardly as best illustrated in Fig. 1 of the drawing and finally removed from its uprooting device as the latter starts downwardly, fingers 41 being employed to pass through the space between the parts of each of the bifurcations 34, so that the finger which passes through the bifurcation of the member carrying the beet, will engage the beet in front and gradually lift it from the uprooting device, after which the beet will slide downwardly and rearwardly to a carrier 42.

The fingers 41 are secured at their rear extremities to a transverse member 43 supported on the framework by brackets 44 which are in turn secured to a transverse piece 45. The fingers extend downwardly and rearwardly from their upper extremities and thus form a sort of inclined chute to conduct the beets downwardly to the transversely arranged carrier 42 which is itself transversely inclined, its rear side being lowermost, whereby the beets as they engage the carrier slide across the same and engage a stationary upright stop plate 46 which guides them as the belt of the carrier moves in a proper direction to a knife 47 which severs the tops or foliage 48 from the bodies of the beets.

The carrier 42 consists of an endless traveling belt composed of a flexible member 50 and slats or flights 51 mounted thereon and extending outwardly therefrom. This belt at the opposite sides of the machine engages wheels 52 journaled in boxes 53 mounted on brackets 54 which extend laterally from the frame bars 6 of the structure, each pair of wheels being fast on a spindle 55.

The rotary knife 47 which serves to perform the beet topping function, is fast on a shaft 56 journaled in a box 57.

The travel is imparted to the belt 50 from the axle 10 of the machine which is equipped with a sprocket wheel 58 from which leads a chain 59 to a smaller sprocket 60 fast on a transverse shaft 61 journaled in the framework of the machine and which is equipped with a fast bevel gear 62 which meshes with a similar gear 63 fast on one of the shafts 55 of the carrier. The shaft 61 is also equipped with a bevel gear 64 which meshes with a similar gear 65 fast on a shaft 66 which has a chain and sprocket connection 67 with the shaft 56 upon which the rotary cutter 47 is mounted, as heretofore explained.

The person in charge of the machine occupies a seat 68 mounted upon an upright part 69 of the framework as shown at 70. Centrally pivoted where the seat is secured to the framework, is a foot plate 71 which extends on opposite sides of a pivot 72 and is hollowed out as shown at 73 for the feet of the operator. The pivot 72 is fast in the foot plate and below said plate is equipped with a sprocket wheel 74 which is connected by means of a chain 75 with a similar wheel 76 fast on a vertically disposed shaft 77 which is journaled on the framework of the machine as shown at 78 and 79 and to whose lower extremity is made fast the caster wheel 13 as shown at 80.

It will thus be understood that by the movement of the foot plate 71 while occupying the seat, the operator may change the direction of the caster wheel 13 and thus guide the machine to a certain extent as it is drawn by the draft animals or moved by other power over the field containing the beets to be harvested.

As illustrated in the drawing, the lower run of the sprocket chain 59 is supported by a guide wheel or idler 81. A sort of fender plate 82 is mounted on the front part of the machine forward of the uprooting devices 20 as they pass upwardly with the uprooted beets. This fender serves to maintain the beets in their proper position in the bifurcation of the corresponding uprooting member and prevents any tendency on the part of the beets to escape from the uprooting devices.

From the foregoing description the operation of my improved machine will be readily understood. As illustrated in the drawing, it is assumed that draft animals are connected with the machine by a set of whiffle-trees of any suitable character. The machine is moved across the field in such a manner that the uprooting devices are in alinement with the row of beets and so that one of the bifurcations 34 of each uprooting device will engage each beet of the row as the machine moves forwardly. All of the members of each uprooting device simultaneously penetrate the ground adjacent the beet, and it is assumed that the beet will be guided into one of the bifurcations 34 of the set of uprooting members while the other members will serve to loosen the ground around the beet and insure the proper performance of the uprooting function. Each beet after it is uprooted is carried upwardly (see Fig. 1) and finally discharged from the uprooting device through the instrumentality of one of the fingers 41, whereby it is guided to the belt 50 of the carrier 42, the beet engaging the carrier about centrally thereof, whence it is carried in the direction indicated by the arrow $d$ to the knife or topping device 47 which severs the top from the body, the top dropping downwardly in the rear of the guide plate 46 while the body is carried in a direction transverse to the travel of the machine and discharged at one extremity of the carrier and at one side of the machine.

In order to change the wheels 14 from the full line to the dotted line position in Fig. 1, it is necessary to remove the fastening devices 19 of the arms 18, in which event the wheels 14 may be swung forwardly to the dotted line position after which fastening devices 38 may be employed to connect the arms 18 to the frame bars 6 at points forwardly located from the position of the devices 19.

As illustrated in the drawing, the cranks 16 of the shaft 15 rest upon a suitable support. This support may consist of two members designated 84 and 85 respectively which are slidably mounted and movable in opposite directions, the said members being equipped with hand pieces to facilitate their movement in the directions indicated by the arrows (see Fig. 2). When the wheels 14 are in the full line position in Fig. 1, one crank rests upon the outer extremity of the member 85 while the other crank rests upon the outer extremity of the member 84. When it is desired to change the wheels 14 from the upper to the lower position, these members 84 and 85 may be shifted to draw their crank-engaging extremities inwardly thus allowing the wheels to move downwardly in the rear of the journal boxes 17.

It should be explained that in changing the position of the wheels 14 from the lower to the upper or the upper to the lower, it will be necessary to support the forward extremity of the frame by the employment of a lifting jack or other suitable device.

Having thus described my invention, what I claim is,—

In a beet harvester the combination with a frame mounted on ground wheels, of an endless traveling carrier mounted on the frame and extending transversely thereof, the said frame being transversely inclined with its rear edge lowermost, means arranged at right angles to the direction of travel of said carrier for delivering beets thereto from above its forward elevated edge, a guide at the lower edge of said carrier and extending lengthwise thereof, and a rotary knife coöperating with said carrier and guide for severing the foliage from the beets as they are moved along by the carrier.

In testimony whereof I affix my signature, in presence of two witnesses.

CHARLES FINKBEINER.

Witnesses:
 GRACE HUSTON,
 A. EBERT O'BRIEN.

Copies of this patent may be obtained for five cents each, by addressing the "Commissioner of Patents, Washington, D. C."